US012700633B2

(12) United States Patent
Park et al.

(10) Patent No.: US 12,700,633 B2
(45) Date of Patent: Aug. 4, 2026

(54) POUCH BAG FOR SECONDARY BATTERY AND POUCH TYPE SECONDARY BATTERY COMPRISING SAME

(71) Applicant: LG Energy Solution, Ltd., Seoul (KR)

(72) Inventors: Yoonwoo Park, Daejeon (KR); Jin Ha Hwang, Daejeon (KR); Hyeon Woo Jang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 619 days.

(21) Appl. No.: 18/025,688

(22) PCT Filed: Jul. 15, 2022

(86) PCT No.: PCT/KR2022/010361
§ 371 (c)(1),
(2) Date: Mar. 10, 2023

(87) PCT Pub. No.: WO2023/018038
PCT Pub. Date: Feb. 16, 2023

(65) Prior Publication Data
US 2023/0369691 A1      Nov. 16, 2023

(30) Foreign Application Priority Data

Aug. 13, 2021      (KR) ........................ 10-2021-0107274

(51) Int. Cl.
*H01M 50/183*      (2021.01)
*H01M 50/105*      (2021.01)
*H01M 50/124*      (2021.01)
*H01M 50/553*      (2021.01)

(52) U.S. Cl.
CPC ....... *H01M 50/183* (2021.01); *H01M 50/105* (2021.01); *H01M 50/124* (2021.01); *H01M 50/553* (2021.01)

(58) Field of Classification Search
CPC ................................................... H01M 50/183
See application file for complete search history.

(56) References Cited

U.S. PATENT DOCUMENTS

| | | | |
|---|---|---|---|
| 2011/0143193 A1 | 6/2011 | Ahn | |
| 2016/0036024 A1 † | 2/2016 | Choi | |
| 2016/0260946 A1 | 9/2016 | Ochi et al. | |
| 2016/0344004 A1 | 11/2016 | Kepler et al. | |

(Continued)

FOREIGN PATENT DOCUMENTS

| | | |
|---|---|---|
| CN | 105794017 A | 7/2016 |
| CN | 106169551 A | 11/2016 |

(Continued)

OTHER PUBLICATIONS

KR20170136880A translation (Year: 2017).*

(Continued)

*Primary Examiner* — Brian R Ohara
(74) *Attorney, Agent, or Firm* — Lerner David LLP

(57) ABSTRACT

A pouch bag that can be opened and closed during the degassing process and a pouch type secondary battery comprising the same, which has an economical effect because the pouch bag surplus portion to be discarded after the degassing process does not occur. This results in a reduction of waste material in the manufacturing process.

9 Claims, 11 Drawing Sheets

(56)      References Cited

U.S. PATENT DOCUMENTS

| | | |
|---|---|---|
| 2020/0212399 A1 | 7/2020 | Choi et al. |
| 2020/0321577 A1 † | 10/2020 | Kim |
| 2021/0098753 A1 | 4/2021 | Kang et al. |
| 2021/0143503 A1 | 5/2021 | Jeong et al. |
| 2021/0280952 A1 | 9/2021 | Wakimoto et al. |

FOREIGN PATENT DOCUMENTS

| | | | |
|---|---|---|---|
| CN | 111033799 A | | 4/2020 |
| CN | 213845369 U | | 7/2021 |
| EP | 3796417 A1 † | | 3/2021 |
| JP | 10101144 A | † | 4/1998 |
| JP | H10-101144 A | | 4/1998 |
| JP | 1186823 A | † | 3/1999 |
| JP | H11086823 A | | 3/1999 |
| JP | 2006185713 A | † | 7/2006 |
| JP | 2010503150 A | † | 1/2010 |
| JP | 2016031934 A | | 3/2016 |
| JP | 2020534650 A | | 11/2020 |
| KR | 20110066448 A | | 6/2011 |
| KR | 20130134242 A | | 12/2013 |
| KR | 2014-0137603 A | | 12/2014 |
| KR | 2015-0012531 A | | 2/2015 |
| KR | 20160045468 A | | 4/2016 |
| KR | 20170101650 A | | 9/2017 |
| KR | 20170103236 A | | 9/2017 |
| KR | 20170136880 A | * 12/2017 | .......... H01M 2/0267 |
| KR | 20190007969 A | | 1/2019 |
| KR | 20190042215 A | | 4/2019 |
| KR | 20190123059 A | | 10/2019 |
| KR | 20190142498 A | | 12/2019 |
| KR | 2021-0088172 A | | 7/2021 |
| WO | 2018021372 A1 | | 2/2018 |
| WO | 2020/101353 A1 | | 5/2020 |

OTHER PUBLICATIONS

International Search Report for Application No. PCT/KR2022/010361 mailed Oct. 25, 2022, 2 pages.
Extended European Search Report including Written Opinion for Application No. 22856039.7 dated Jul. 5, 2024. 8 pgs.
Search Report dated Aug. 26, 2025 from the Office Action for Chinese Application No. 202280005666.9 issued Aug. 29, 2025, pp. 1-3.

\* cited by examiner
† cited by third party

【Figure 1】
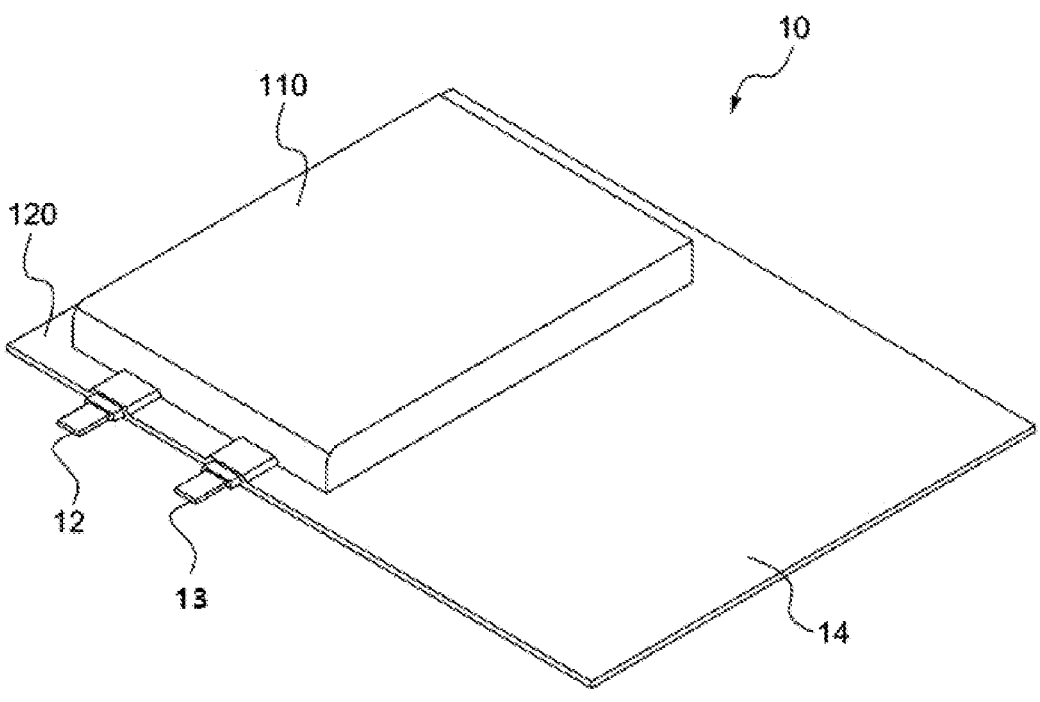
Prior Art

【Figure 2】
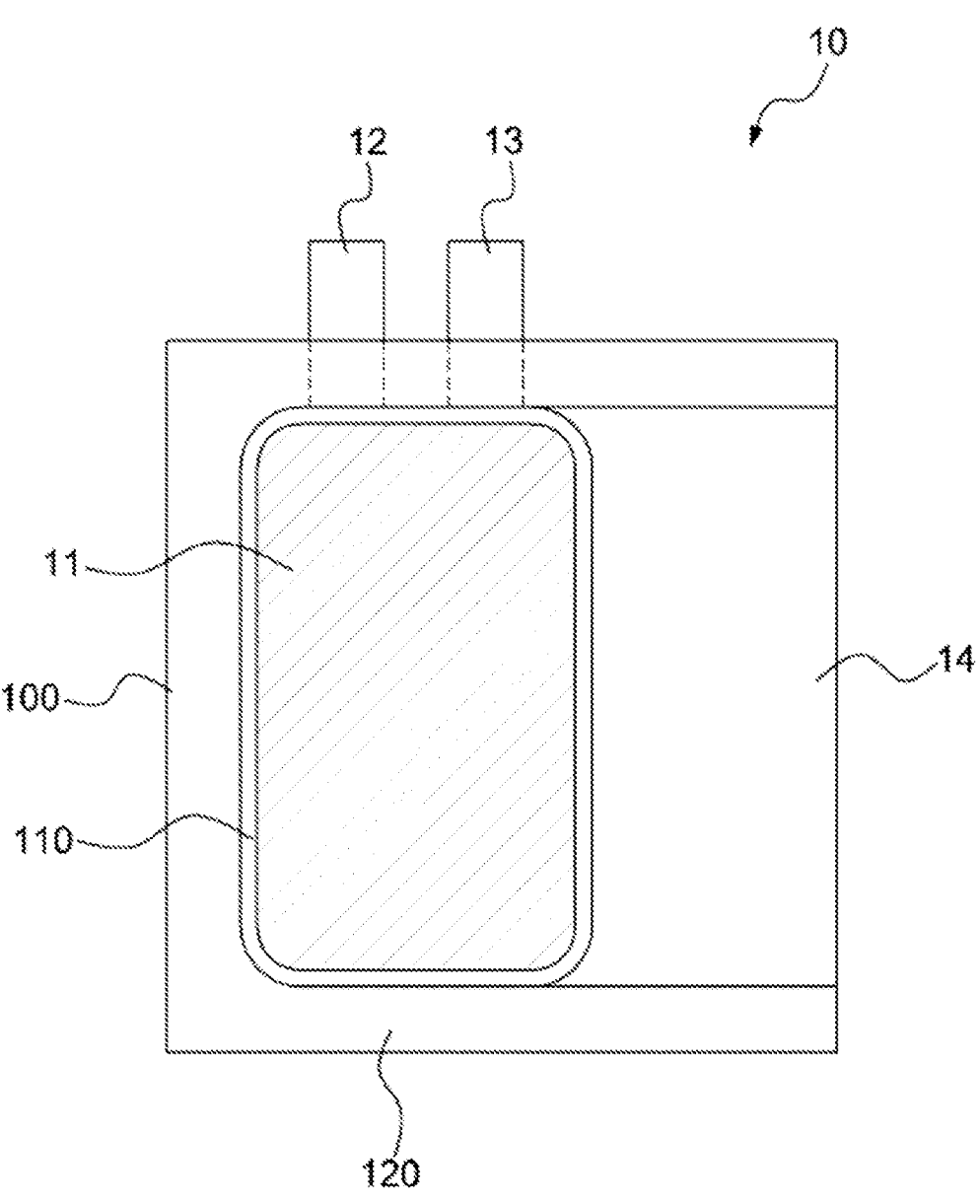
Prior Art

【Figure 3】
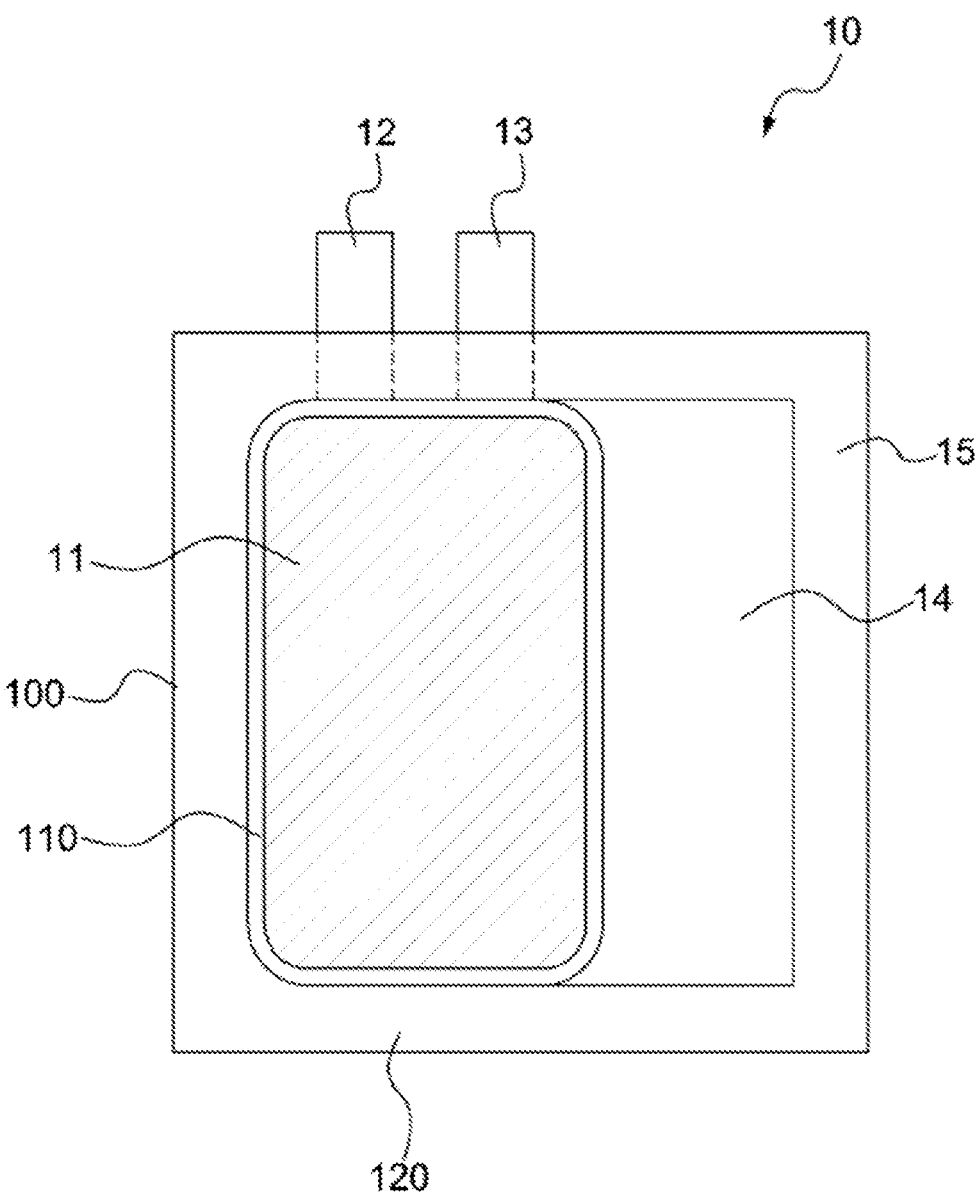
Prior Art

【Figure 4】
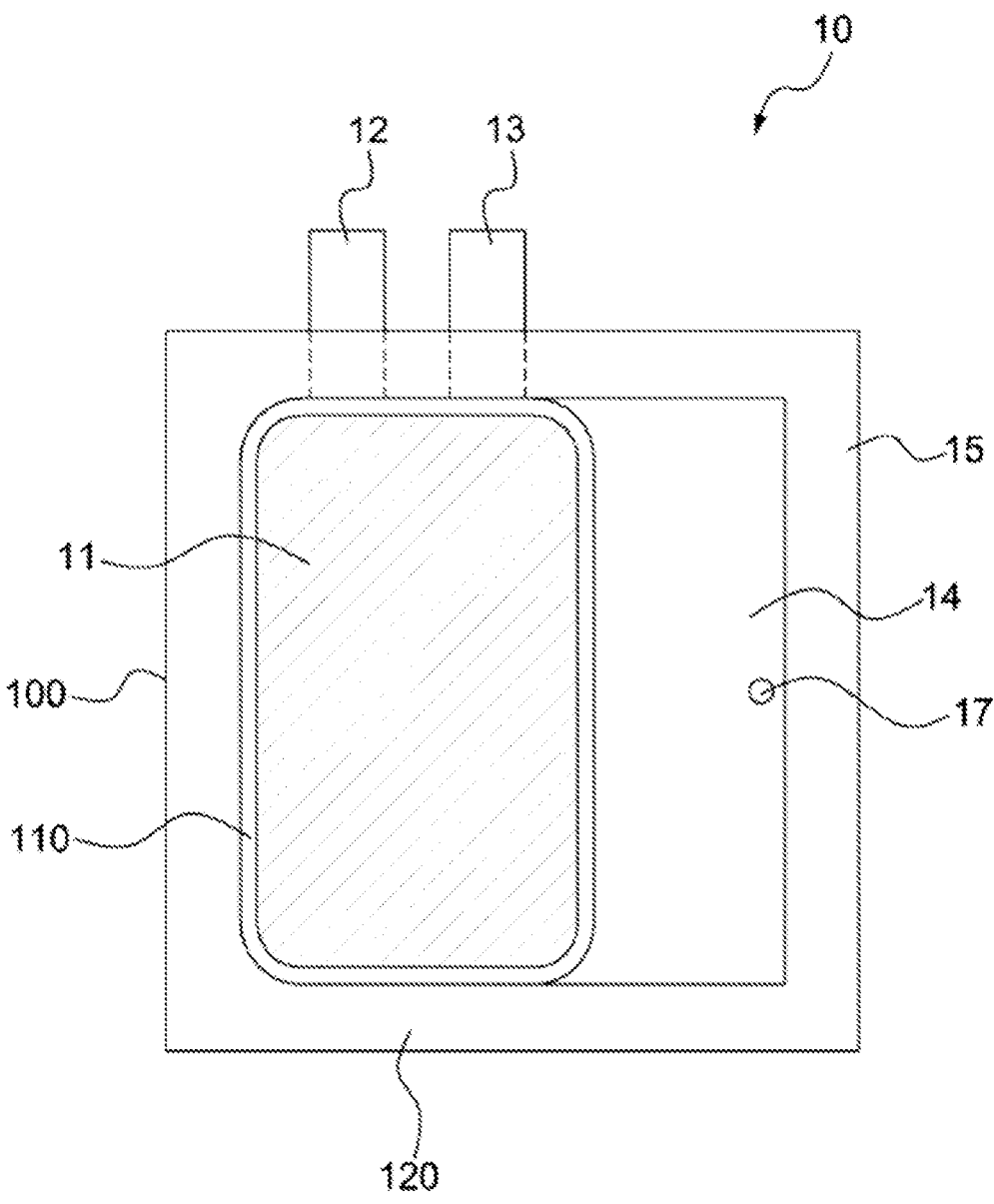
Prior Art

【Figure 5】
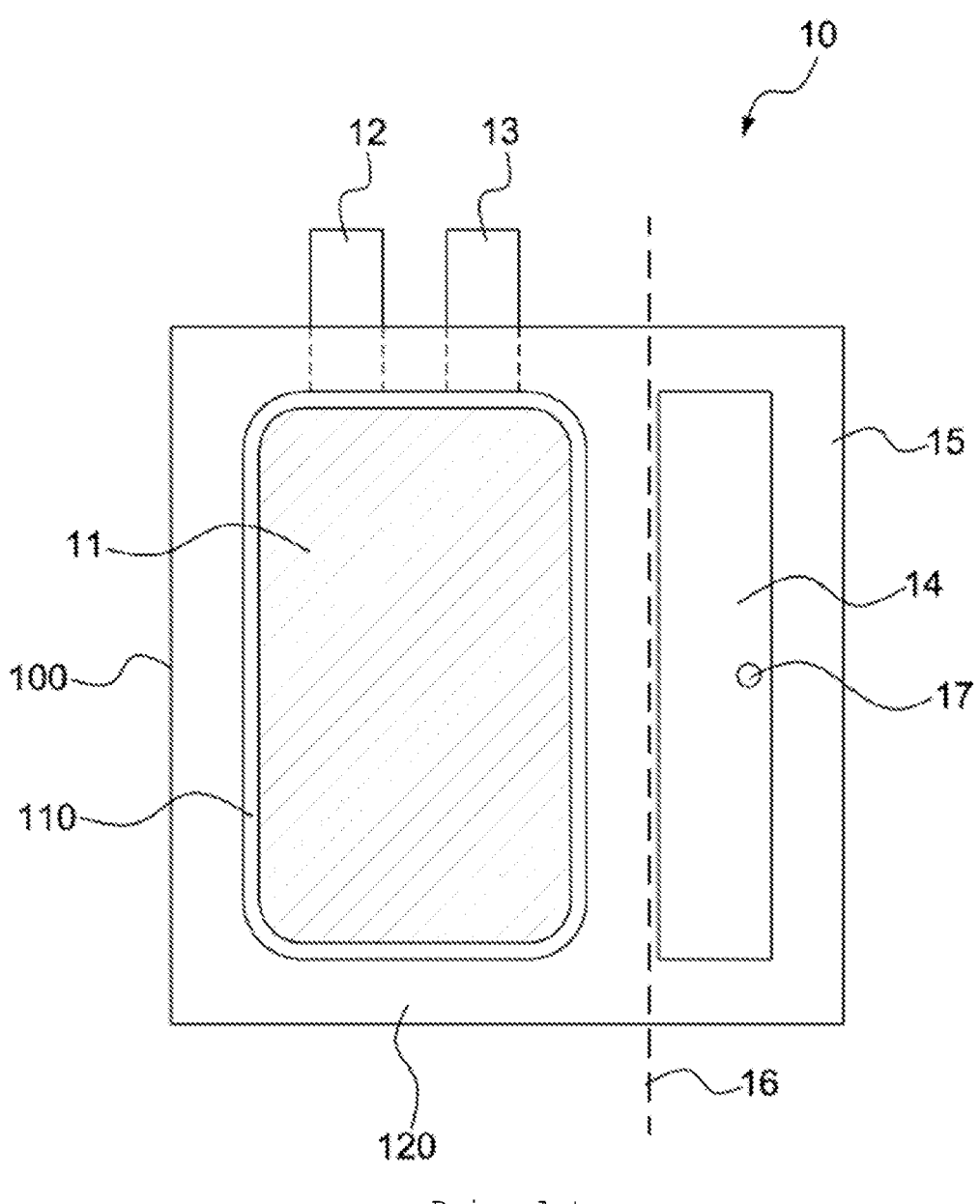
Prior Art

【Figure 6】
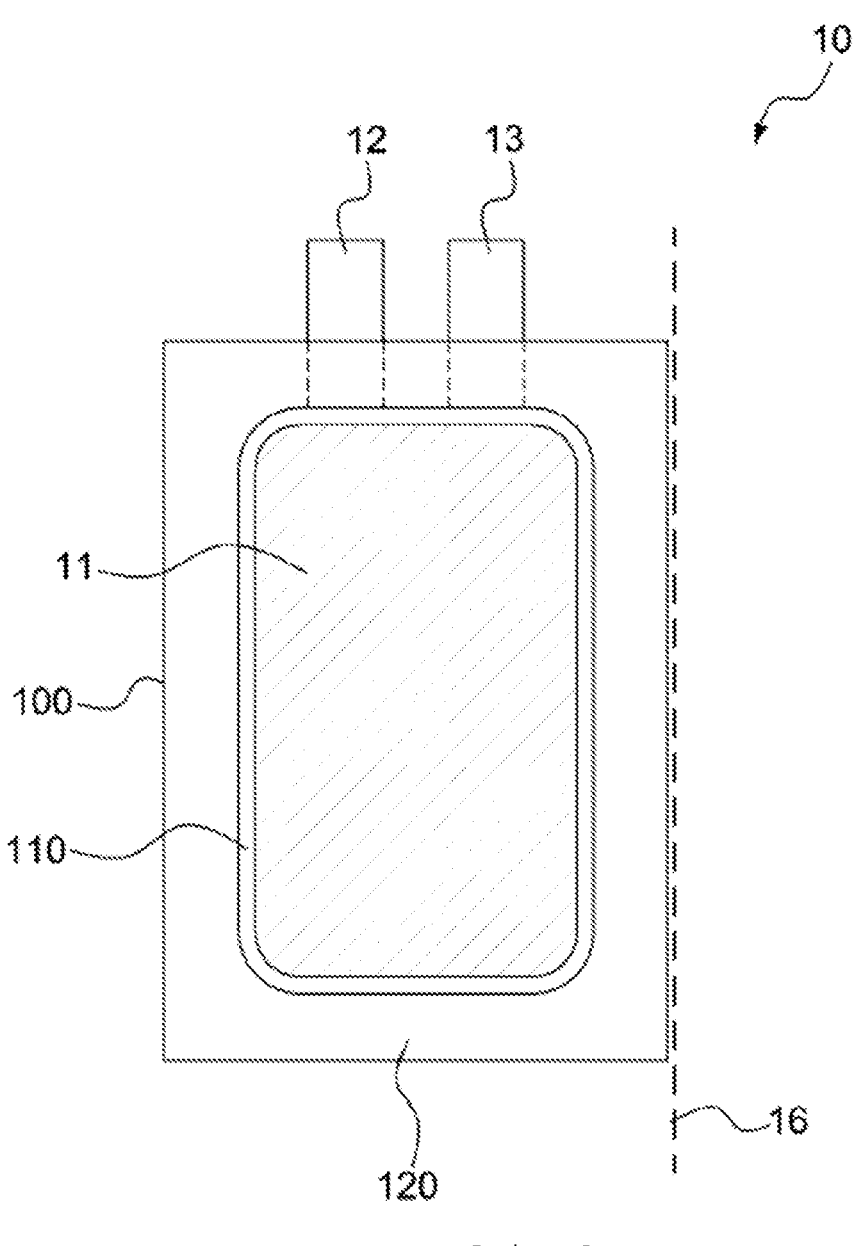
Prior Art

【Figure 7】
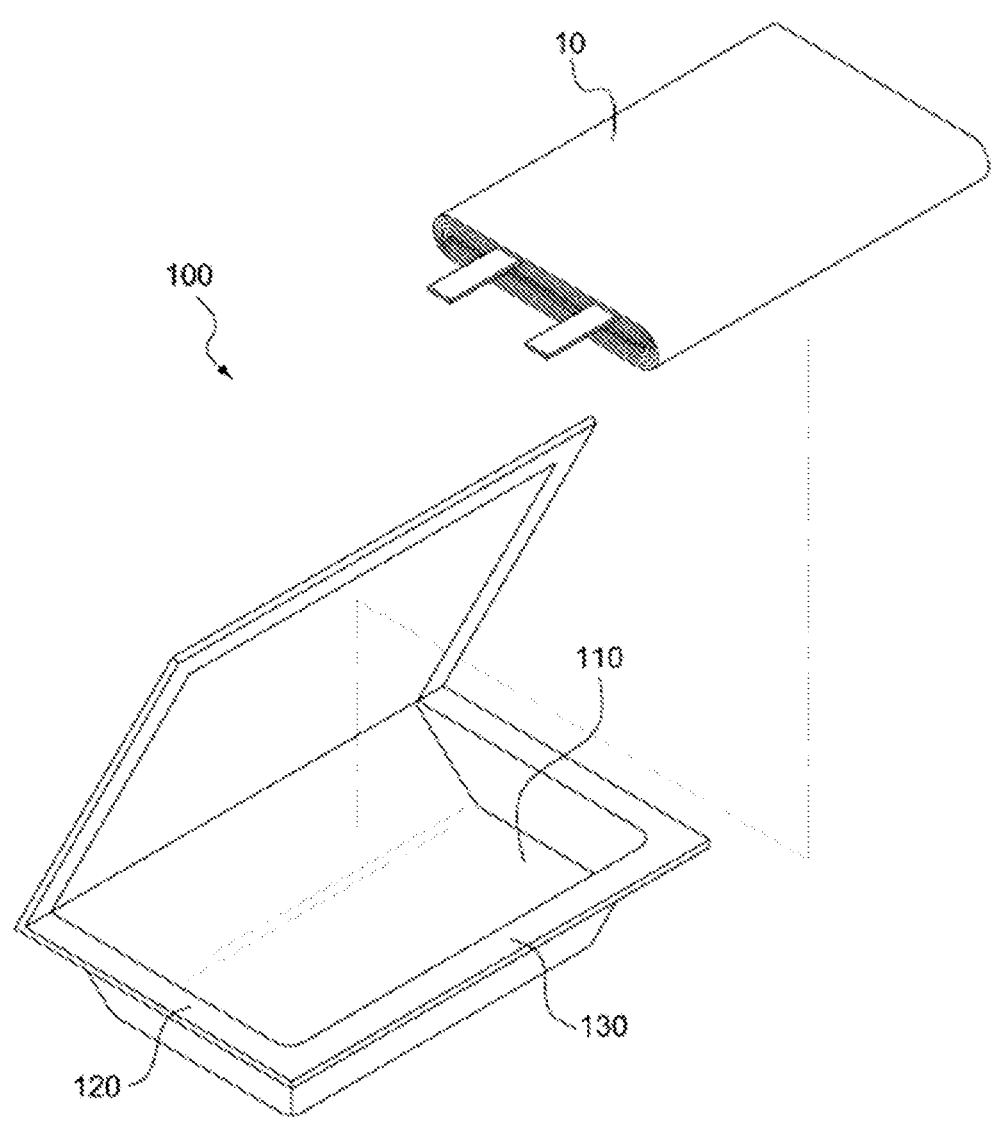

【Figure 8】
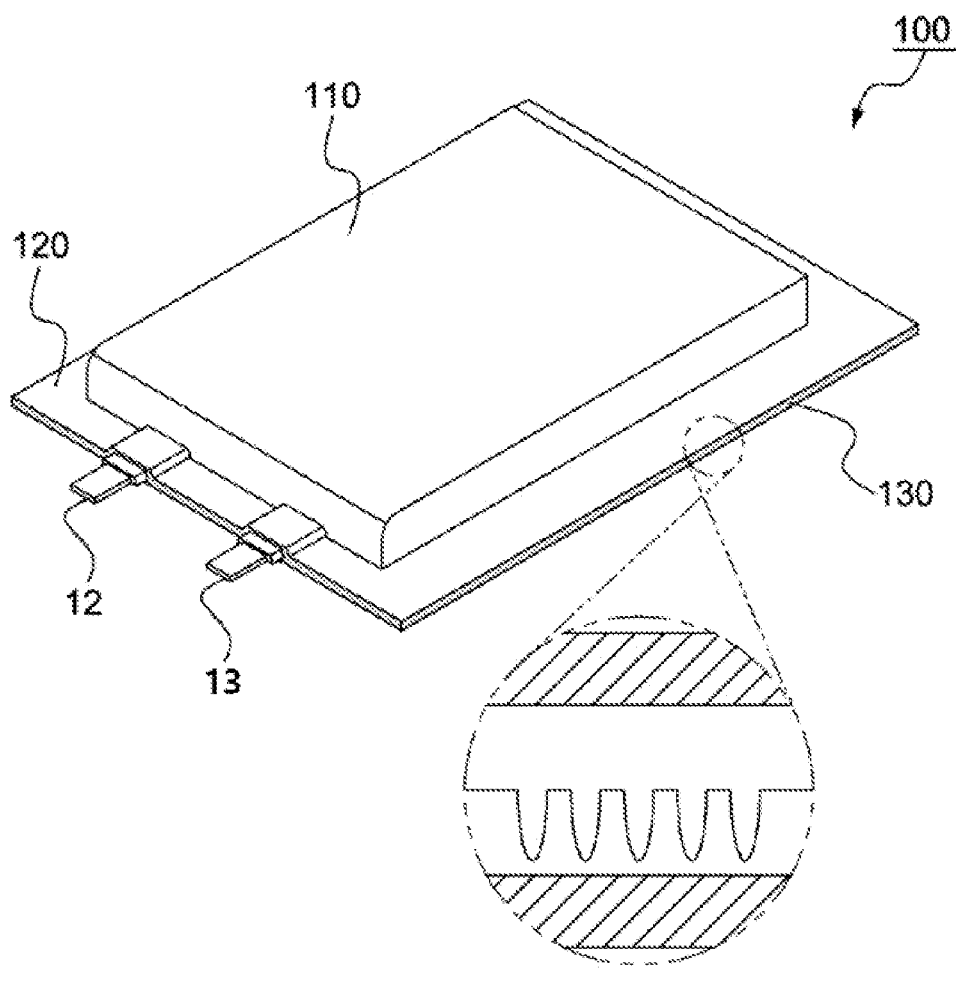

【Figure 9】
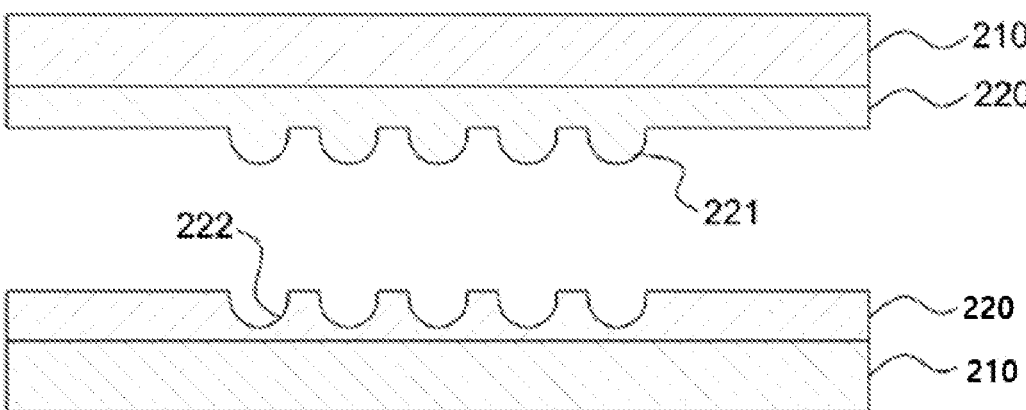

【Figure 10】
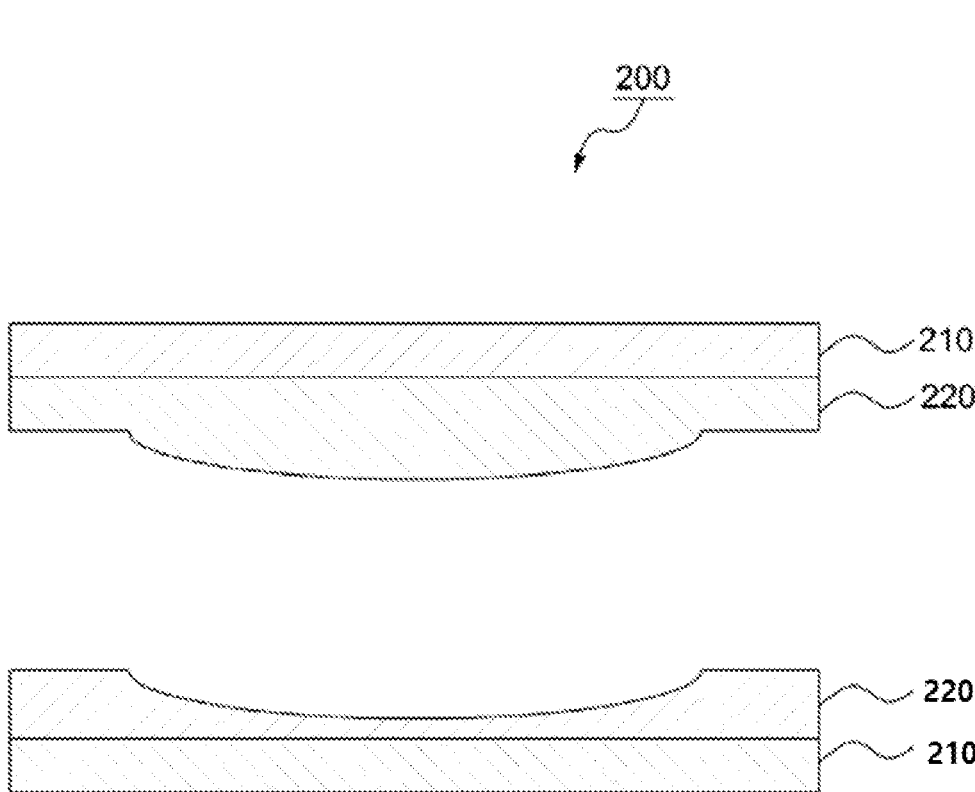

【Figure 11】
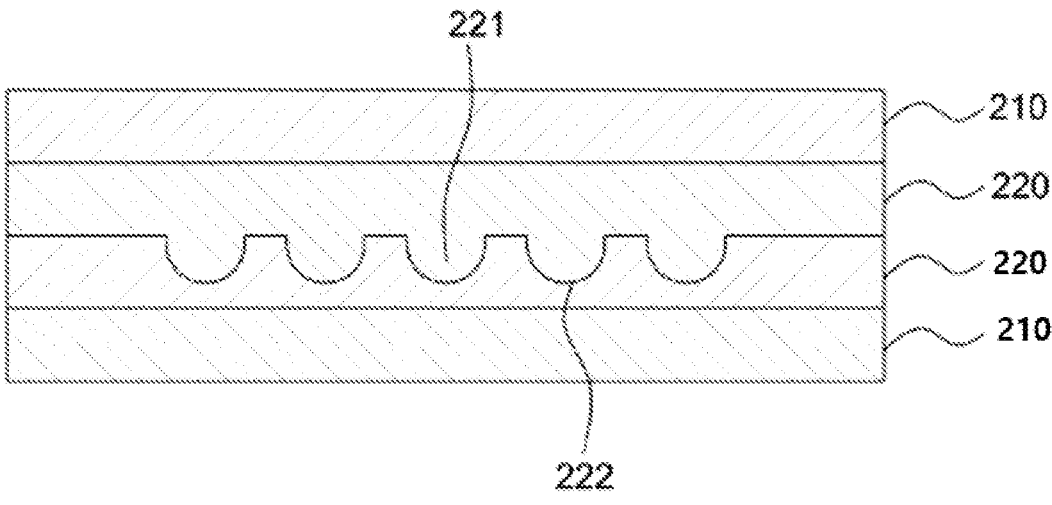

POUCH BAG FOR SECONDARY BATTERY AND POUCH TYPE SECONDARY BATTERY COMPRISING SAME

CROSS-REFERENCE TO RELATED APPLICATIONS

The present application is a national phase entry under 35 U.S.C § 371 of International Application No. PCT/KR2022/010361 filed on Jul. 15, 2022 which claims priority from Korean Patent Application No. 10-2021-0107274 filed on Aug. 13, 2021, all of which are incorporated herein by reference.

TECHNICAL FIELD

The present invention relates to a pouch bag for a secondary battery and a pouch type secondary battery comprising the same.

BACKGROUND ART

The secondary battery is widely used as a power source for mobile devices such as cell phones, laptops, and camcorders. In particular, the use of the lithium secondary battery is rapidly increasing due to the advantages of high operating voltage and high energy density per unit weight.

These lithium secondary batteries mainly use lithium-based oxide as a positive electrode active material and a carbon material as a negative electrode active material, and generally are classified into lithium-ion batteries, lithium ion polymer batteries and lithium polymer batteries depending on the type of electrolyte used, and are also classified into cylindrical, prismatic, and pouch type secondary batteries according to the shape of the battery. Typically, in terms of battery shape, there is a high demand for a prismatic secondary battery and a pouch type secondary battery with a thin thickness that can be applied to products such as mobile phones.

Among them, there is a lot of interest in a pouch type secondary battery which has no restrictions on shape and size and is easy to assemble through heat sealing, and particularly is suitable for the production of light-weight and thin-thick cells as it is easy to release gas or liquid when abnormal behavior occurs. In general, the pouch type secondary battery has a structure in which an electrode assembly is embedded in a pouch bag made of an aluminum laminate sheet. That is, the pouch type secondary battery is manufactured by forming an accommodating portion for mounting the electrode assembly on an aluminum laminate sheet, and heat-sealing a separate aluminum laminate sheet separated from the aluminum laminate sheet or an extended aluminum laminate sheet in a state where the electrode assembly is mounted on the accommodating portion.

In the method of manufacturing the pouch type secondary battery, an electrode assembly is mounted on the accommodating portion, and then, an electrolyte solution is injected, and the pouch bag is sealed. Afterwards, an additional degassing process is performed to remove the gas contained in the electrolyte solution. After that, a process of cutting unnecessary aluminum laminate sheet is performed to manufacture a pouch type secondary battery. An aluminum laminate sheet should be made large in size to prepare for gas generation and a large amount of the sheet is discarded after the degassing process.

Therefore, in consideration of economic feasibility, etc., there is a need for a pouch bag that can be manufactured without the sheet being discarded after the degassing process.

DISCLOSURE

Technical Problem

It is an object of the present invention to provide a pouch bag that can be opened and closed, wherein the pouch bag can be opened to remove the gas, and then, the pouch bag can be closed, in the degassing process of removing gas during the manufacturing process of the pouch type secondary battery.

Technical Solution

In order to achieve the above object, the present invention provides a pouch bag for a secondary battery comprising an electrode assembly accommodating portion and a sealing portion, and having an opening and closing portion that can be repeatedly opened and closed with respect to the sealing portion.

In one embodiment of the present invention, the pouch bag may be composed of a pouch film comprising a metal layer and an inner resin layer formed on one surface of the metal layer, and the opening and closing portion may comprise a protrusion portion provided in one inner resin layer of the two pouch films sealed together and a protrusion fixing portion provided in the other inner resin layer.

In one embodiment of the present invention, the sealing portion may be positioned in the form of a ring around the electrode assembly accommodating portion, and the opening and closing portion may be formed in the sealing portion on the left or right side with respect to the axis on which the electrode terminal is located when the electrode assembly is accommodated.

In one embodiment of the present invention, the protrusion portion may have a protrusion protruding from the surface of the inner resin layer, and the protrusion fixing portion may have a groove recessed from the surface of the inner resin layer.

In one embodiment of the present invention, the protrusion may be formed in multiple numbers on a straight line on the surface of the inner resin layer, and the recessed groove may be formed in multiple numbers on a straight line on the surface of the inner resin layer.

In one embodiment of the present invention, the protrusion may protrude in the form of a spherical or polygonal column, and the groove may be recessed in the form of a spherical or polygonal column.

In one embodiment of the present invention, the protrusion may be formed in a continuous line on a straight line on the surface of the inner resin layer, and the recessed groove may be formed in a continuous line on a straight line on the surface of the inner resin layer.

In one embodiment of the present invention, the opening and closing portion may be opened and closed by fitting and disengaging the protrusion portion and the protrusion fixing portion.

In addition, the present invention provides a pouch type secondary battery comprising: a pouch bag of the present invention;

an electrode assembly accommodated in the pouch bag; and an electrolyte solution charged in the pouch bag.

Advantageous Effects

The pouch bag of the present invention can be opened and closed, so that when the pouch type secondary battery is manufactured, the pouch bag can be opened to remove gas and then the pouch bag can be closed. Therefore, the pouch bag of the present invention has an advantage of very excellent economic efficiency because there is no pouch bag to be discarded after the gas removal process.

DESCRIPTION OF DRAWINGS

FIG. 1 is a diagram schematically showing the shape of a pouch type secondary battery before removal of a surplus portion during the manufacturing process of a conventional pouch type secondary battery.

FIGS. 2 to 6 are views schematically showing a degassing process during the manufacturing process of a conventional pouch type secondary battery.

FIG. 7 is a perspective view showing an opened state of the pouch bag of the present invention.

FIG. 8 is a perspective view showing a closed state of the pouch bag of the present invention.

FIG. 9 is a view showing the opened state of the opening and closing portion of the pouch bag as one embodiment of the present invention.

FIG. 10 is a cross-sectional view showing an opened state of the opening and closing portion of the pouch bag as one embodiment of the present invention.

FIG. 11 is a cross-sectional view showing the closed state of the opening and closing portion of the pouch bag as one embodiment of the present invention.

BEST MODE

Hereinafter, the present invention will be described in detail based on the accompanying drawings so that those of ordinary skill in the art can easily carry out the present invention. However, the present invention may be embodied in various different forms and is not limited to the embodiments described herein.

In order to clearly explain the present invention, parts irrelevant to the description are omitted, and the same reference numerals are assigned to the same or similar elements throughout the specification.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Hereinafter, an embodiment will be described in detail with reference to the accompanying drawings. However, the present invention may be embodied in various different forms, and is not limited to the embodiments described herein.

FIG. 1 is a view schematically showing the shape of a pouch type secondary battery before removal of a surplus portion during a manufacturing process of a conventional pouch type secondary battery and is a state in which an electrode assembly is accommodated in an electrode assembly accommodating portion 110.

FIGS. 2 to 6 are views schematically showing a degassing process during the manufacturing process of a pouch type secondary battery using a conventional pouch bag.

The degassing process during the manufacturing process of the conventional pouch type secondary battery will be described as follows:

First, as shown in FIG. 2, the electrode assembly 11 is mounted on the electrode assembly accommodating portion 110 of a pouch bag 100, and a sealing portion 120, which is a portion of the outer circumferential surface surrounding the electrode assembly 11 except for a surplus portion 14, is heat-fused and sealed. Since the surplus portion 14 is not sealed, an electrolyte solution is injected through the surplus portion 14.

Next, as shown in FIG. 3, a formation process is proceeded by heat-fusing the end 15 of the edge of one side of the surplus portion 14 and performing charging and discharging to activate the pouch type secondary battery 10. The formation process is performed for the purpose of suppressing the decomposition reaction of the electrolyte solution in the completed secondary battery by forming a protective film by the electrolyte solution on the surface of the electrode (especially, negative electrode). Gas is generated inside the battery during the formation process, and the generated gas and excess electrolyte solution are collected and trapped in the surplus portion 14.

After that, as shown in FIG. 4, a through-hole 17 is formed in the surplus portion 14 to perform a degassing process for discharging gas through the through-hole 17. After the degassing process, as in FIG. 5, the outer peripheral surface between a cutting portion 16 and the electrode assembly 11 based on the cutting portion 16 is sealed, and the surplus portion 14 is removed by cutting along the cutting portion 16.

The conventional pouch-type bag 100 requires the surplus portion 14 in which gas is trapped, and the surplus portion 14 is removed by cutting along the cutting portion 16 after the degassing process of removing the gas trapped in the surplus portion 14. Therefore, there is a problem that the pouch bag to be discarded occurs, which is not economical.

Accordingly, the present invention is to provide a pouch bag capable of manufacturing a pouch type secondary battery without the pouch bag to be discarded.

Hereinafter, the pouch bag for the secondary battery according to an embodiment will be described with reference to FIGS. 7 to 11.

FIG. 7 shows an opened state of the pouch bag 100 for secondary batteries according to an embodiment of the present invention, and FIG. 8 shows a closed state of the pouch bag 100 for secondary batteries according to an embodiment of the present invention. FIG. 8 shows a state in which the electrode assembly 10 is accommodated in the electrode assembly accommodating portion 110.

Referring to FIGS. 7 and 8, the pouch bag 100 for the secondary battery according to an embodiment of the present invention comprises the electrode assembly accommodating portion 110 and the sealing portion 120, and the sealing portion 120 is provided with the opening and closing portion 130 that can be repeatedly opened and closed.

The sealing portion 120 is positioned in the form of a ring around the electrode assembly accommodating portion 110, and the opening and closing portion 130 may be formed on the left or right sealing portion based on the axis on which the electrode terminal is located when the electrode assembly is accommodated. Specifically, the sealing portion 120 may be positioned in the form of a quadrangular ring around the electrode assembly accommodating portion 110.

The pouch bag 100 for the secondary battery may be composed of a pouch film 200 comprising a metal layer 210 and an inner resin layer 220 formed on one surface of the metal layer 210.

In one embodiment of the present invention, the opening and closing portion 130 may comprise a protrusion portion 221 provided on the inner resin layer 220 of any one of the two pouch films 200 sealed together, and the protrusion fixing portion 222 provided on the other inner resin layer, as shown in FIGS. 9 to 11.

The protrusion portion 221 may have a protrusion protruding from the surface of the inner resin layer 220, and the protrusion fixing portion 222 may have a groove recessed from the surface of the inner resin layer 220.

As shown in FIG. 9, the protrusion may be formed in in multiple numbers on a straight line on the surface of the inner resin layer 220. In addition, the protrusion may have a separation distance from another adjacent protrusion. The recessed grooves may be formed in in multiple numbers on a straight line on the surface of the inner resin layer 220. In this case, the protrusions and grooves may be formed in the same number and at a distance spaced apart from each other.

In addition, the protrusion protrudes from the surface of the inner resin layer 220 in the form of a spherical or polygonal column, and the groove is recessed from the surface of the inner resin layer 220 in the form of a spherical or polygonal column. In this case, the shape of the protrusion and the shape of the groove may be the same.

In addition, as shown in FIG. 10, the protrusion may be formed in a continuous line on a straight line on the surface of the inner resin layer 220, and the recessed grooves may be formed in a continuous line on a straight line on the surface of the inner resin layer 220. The protrusions and grooves may have a cross-section in the longitudinal direction of a circular shape, a polygonal shape, or the like.

According to an embodiment of the present invention, the opening and closing of the pouch bag 100 for the secondary battery of the present invention may be performed by fitting and disengaging the protrusion portion 221 and the protrusion fixing portion 222.

FIGS. 9 and 10 are views showing the opened state of the opening and closing portion 130 of the pouch bag 100 for the secondary battery. That is, FIGS. 9 and 10 show the disengaged state of the protrusion portion 221 and the protrusion fixing portion 222, which is a state in which the protrusion of the protrusion portion 221 is not fitted into the recessed groove of the protrusion fixing portion 222.

FIG. 11 shows the closed state of the opening and closing portion 130 of the pouch bag 100 for the secondary battery. That is, FIG. 11 shows a state in which the protrusion portion 221 and the protrusion fixing portion 222 are fitted. More specifically, as the protrusion of the protrusion portion 221 is fitted into the recessed groove of the protrusion fixing portion 222, the opening and closing portion 130 of the pouch bag 100 may be closed.

According to one embodiment of the present invention, as the pouch bag 100 of the present invention can be opened and closed by fitting and disengaging the protrusion portion 221 and the protrusion fixing portion 222, when manufacturing the pouch type secondary battery, a surplus portion in which gas is trapped is not required. Accordingly, the present invention does not require the step of removing the surplus portion by cutting the cutting portion, and the present invention may have an economical effect because the surplus portion to be removed does not occur, and thus a pouch-type secondary battery can be manufactured even without the pouch-type bag being discarded.

Specifically, in a state in which the protrusion portion 221 and the protrusion fixing portion 222 are disengaged, that is, in a state in which the pouch-type bag 100 is opened, the degassing process may be performed to discharge the gas. After the degassing process, the protrusion portion 221 and the protrusion fixing portion 222 are fitted, that is, the pouch-type bag 100 is in a closed state to finally manufacture a pouch type secondary battery.

Therefore, the pouch-type bag 100 according to an embodiment of the present invention can be opened and closed according to the fitting and disengaging of the protrusion portion 221 and the protrusion fixing portion 222, and thus does not need to include a separate surplus portion that is discarded after gas collection and thus is very economical because the pouch-type bag to be discarded does not occur.

In addition, the pouch type secondary battery according to one embodiment of the present invention may comprise the pouch bag according to one embodiment of the present invention described above; an electrode assembly accommodated in the pouch bag; and an electrolyte solution charged in the pouch bag.

The electrode assembly and the electrolyte solution may be those known in the art.

It will be understood by those of ordinary skill in the art related to this embodiment that the present invention can be implemented in a modified form without departing from the essential characteristics of the above description. Therefore, the disclosed methods are to be considered in an illustrative sense rather than a limiting sense. The scope of the present invention is indicated in the claims rather than the foregoing description, and all differences within the scope equivalent thereto should be construed as being included in the present invention.

DESCRIPTION OF SYMBOL

10: Pouch type secondary battery
11: Electrode assembly
12, 13: Electrode terminal
14: Surplus portion
15: End of edge of surplus portion
16: Cutting portion
17: Through-hole
100: Pouch-type bag
110: Electrode assembly accommodating portion
120: Sealing portion
130: Opening and closing portion
200: Pouch film
210: Metal layer
220: Inner resin layer
221: Protrusion portion
222: Protrusion fixing portion

The invention claimed is:

1. A pouch bag for a secondary battery, comprising:
an electrode assembly accommodating portion;
a sealing portion; and
an opening and closing portion configured to be repeatedly opened and closed with respect to the sealing portion,
wherein the pouch bag comprises:
a first pouch film and a second pouch film, the first pouch film including a first metal layer and a first inner resin layer positioned on a first surface of the first metal layer, and the second pouch film including a second metal layer and a second inner resin layer positioned on a first surface of the second metal layer; and the opening and closing portion including a protrusion portion provided on the first inner resin layer of the first pouch film sealed together with the second pouch film, and a protrusion fixing portion provided on the second inner resin layer of the second pouch film, wherein the protrusion portion has a protrusion protruding from a surface of the first inner resin layer, and the protrusion fixing portion includes a groove, the groove being recessed in a surface of the second inner resin layer within which the protrusion portion is configured to be disposed, wherein the first inner resin layer of the first pouch film includes a first planar surface extending along and facing the second inner resin layer, wherein the protrusion is entirely protruded from the first planar surface, wherein the second inner resin layer of the second pouch film includes a second planar surface extending along and facing the first inner resin layer, and wherein the groove is entirely recessed in the second planar surface.

2. The pouch bag for the secondary battery according to claim 1, wherein the sealing portion is positioned in a ring form configured to surround a perimeter of the electrode assembly accommodating portion, and the opening and closing portion is positioned on a left sealing portion or a right sealing portion in an axial dimension of the pouch bag, the axial dimension being parallel to an axis along which the electrode terminal extends when the electrode assembly is accommodated.

3. The pouch bag for the secondary battery according to claim 1, wherein the protrusion portion includes a plurality of protrusions on the surface of the first inner resin layer, the plurality of protrusions being spaced apart from each other along a linear dimension extending along the surface of the first inner resin layer and wherein the protrusion fixing portion includes a plurality of grooves, the plurality of grooves being spaced apart from each other along a linear dimension extending along the surface of the second inner resin layer.

4. The pouch bag for the secondary battery according to claim 1, wherein the protrusion protrudes in the form of a spherical column or a polygonal column, and the groove is configured to receive the protrusion therein.

5. The pouch bag for the secondary battery according to claim 1, wherein the protrusion is elongated along a continuous line in an axial dimension on the surface of the first inner resin layer, and the groove is elongated along a continuous line in the axial dimension on the surface of the second inner resin layer.

6. The pouch bag for the secondary battery according to claim 1, wherein the opening and closing portion is configured to be opened and closed by fitting and disengaging the protrusion portion within the protrusion fixing portion.

7. A pouch type secondary battery comprising:
the pouch bag according to claim 1;
an electrode assembly accommodated in the pouch bag; and
an electrolyte solution charged in the pouch bag.

8. The pouch bag for the secondary battery according to claim 1, wherein the second planar surface of the second inner resin layer does not include a protrusion protruding therefrom.

9. The pouch bag for the secondary battery according to claim 1, wherein the first planar surface of the first inner resin layer does not include a groove recessing therefrom.

* * * * *